US012669408B2

(12) United States Patent (10) Patent No.: US 12,669,408 B2
Lu (45) Date of Patent: Jun. 30, 2026

(54) THRUST REVERSER ACTUATION SYSTEM LOCK TESTER

(71) Applicant: Woodward, Inc., Fort Collins, CO (US)

(72) Inventor: Jiahua Lu, Montebello, CA (US)

(73) Assignee: Woodward, Inc., Fort Collins, CO (US)

( * ) Notice: Subject to any disclaimer, the term of this patent is extended or adjusted under 35 U.S.C. 154(b) by 308 days.

(21) Appl. No.: 18/235,666

(22) Filed: Aug. 18, 2023

(65) Prior Publication Data

US 2025/0060280 A1 Feb. 20, 2025

(51) Int. Cl.
*G01M 15/14* (2006.01)
*F02K 1/76* (2006.01)

(52) U.S. Cl.
CPC ............. *G01M 15/14* (2013.01); *F02K 1/766* (2013.01)

(58) Field of Classification Search
CPC ......... G01M 15/14; F02K 1/766; F02K 1/763
See application file for complete search history.

(56) References Cited

U.S. PATENT DOCUMENTS

| 8,715,132 | B2 | 5/2014 | Kopecek |
| 9,188,082 | B2 | 11/2015 | Colin et al. |
| 9,689,345 | B2 | 6/2017 | Kopecek |
| 9,752,533 | B2 | 9/2017 | Allut et al. |
| 9,790,892 | B2 | 10/2017 | Willett et al. |
| 2003/0019206 | A1* | 1/2003 | Johnson .................. F02K 1/763 |
| | | | 60/204 |

| 2015/0275821 | A1 | 10/2015 | Willett et al. |
| 2016/0252050 | A1* | 9/2016 | Allut ....................... F02K 1/766 |
| | | | 70/263 |
| 2016/0328892 | A1* | 11/2016 | Coupard .............. G07C 5/0816 |
| 2019/0293023 | A1* | 9/2019 | Guerinot ................ F02K 1/605 |
| 2021/0372348 | A1* | 12/2021 | Burgess .................. F02K 1/763 |

FOREIGN PATENT DOCUMENTS

FR 3025256 A1 3/2016

OTHER PUBLICATIONS

International Search Report and Written Opinion in International Application No. PCT/US2024/042878, mailed on Sep. 29, 2025, 13 pages.

* cited by examiner

*Primary Examiner* — Ricky Go
(74) *Attorney, Agent, or Firm* — Taft Stettinius & Hollister LLP

(57) ABSTRACT

The subject matter of this specification can be embodied in, among other things, method for testing operation of a thrust reverser actuator lock includes determining, by a controller, that an actuator output of a controllable actuator is at a predetermined first position, locking, by the controller, an actuator lock configured to prevent movement of the actuator output of an actuator away from the predetermined first position, initiating, by the controller, actuation of the actuator output away from the predetermined first position, determining, by the controller based on a position feedback sensor, a second position of the actuator output, determining, by the controller, a nominal condition of the actuator lock based on determining that the second position is within a predetermined threshold distance from the predetermined first position of the actuator output, and providing, by the controller and based on the determined nominal condition, a signal indicative of the nominal condition.

19 Claims, 5 Drawing Sheets

THRUST REVERSER ACTUATION SYSTEM LOCK TESTER

TECHNICAL FIELD

This instant specification relates to test systems for aircraft actuators, more specifically test systems for aircraft thrust reverser actuator system deployment locks.

BACKGROUND

Contemporary aircraft engines may include a thrust reverser actuation system (TRAS) to assist in reducing the aircraft speed during landing. Typical thrust reversers include a movable transcowl that, when in the active position, reverses at least a portion of the airflow passing through the engine.

Accidental or inadvertent activation and deployment of thrust reversers at inappropriate times can be dangerous or deadly. Accidental deployment on the ground while ground crews are performing service on the engine can result in injury or death. Accidental activation during flight can cause a catastrophic loss of airspeed or failure of the airframe. Mechanical malfunctions, such as a loss of hydraulic pressure, can also allow a reverser to move out of the stowed position at an inappropriate time.

To prevent accidental or unintentional thrust reverser deployment, locking mechanisms are used. Before the thrust reverser can be moved from its stowed position, the lock must first be disengaged. Such locking systems are typically tested periodically, while the aircraft is on the ground, in order to verify proper lock operation or to identify lock malfunctions.

Prior testing processes can be very manual in nature. In an example of a prior process, a circuit breaker is manually opened in order to intentionally prevent an electrical unlock signal from reaching the lock, then the actuator is actuated toward deployment, and then deployment is observed manually, either through direct observation of the actuator or through observation of a sensor indicator. If the lock mechanism is functioning properly, the still-locked lock will prevent substantial movement of the actuator away from its stowed position. Observation of substantial movement of the actuator during the test is indicative of a malfunction somewhere in the system.

Such manual processes can be time consuming and can require the attention of multiple service personnel. For example, air regulations may require an electrical specialist to open the circuit breaker, another person may be required to trigger the deployment from the cockpit, another person may be needed on the ground to observe the actuator, the electrical specialist may be required to close the circuit breaker, and yet another person may be needed to verify that the circuit breaker and the actuator have been returned to a safe and airworthy state.

SUMMARY

In general, this document describes test systems for aircraft thrust reverser actuator system deployment locks.

In a general example, a computer-implemented method for testing operation of a thrust reverser actuator lock for an aircraft thrust reverser actuation system includes determining, by a controller, that an actuator output of a controllable actuator is at a predetermined first position, locking, by the controller, an actuator lock configured to prevent movement of the actuator output of an actuator away from the predetermined first position, initiating, by the controller, actuation of the actuator output away from the predetermined first position, determining, by the controller based on a position feedback sensor, a second position of the actuator output, determining, by the controller, a nominal condition of the actuator lock based on determining that the second position is within a predetermined threshold distance from the predetermined first position of the actuator output, and providing, by the controller and based on the determined nominal condition, a signal indicative of the nominal condition.

Various examples can use some, all, or none of the following features. The method can include storing, by the controller, a value representative of the nominal condition. The method can include determining, by the controller, a malfunction condition of the actuator lock based on determining that the second position is outside of the predetermined threshold distance from the predetermined first position of the actuator output, and providing, by the controller, a signal indicative of a malfunction condition of the actuator lock. The method can include storing, by the controller, a value representative of the malfunction condition. The actuator output can be moveable from the predetermined first position through an operational distance to a predetermined third position, and the predetermined threshold distance is less than the operational distance. The position sensor can be configured to detect movement of the actuator output away from the predetermined first position. The method can include receiving a test initiation signal, where the controller is configured to perform the locking based on the received test initiation signal. The method can include determining, by the controller, one or more of a predetermined aircraft operational state, a predetermined time interval, or a predetermined aircraft operational status, where the controller is configured to perform the locking based on the predetermined aircraft operational status, the predetermined time interval, or the predetermined aircraft operational status.

In another general example, a test system for testing operation of a thrust reverser actuator lock for an aircraft thrust reverser actuation system includes a controllable actuator configured to actuate an actuator output between a predetermined first position and a second position different from the predetermined first position, an actuator lock controllable to a locked configuration configured to prevent movement of the controllable actuator output beyond a predetermined distance away from the predetermined first position toward the second position, and an unlocked configuration in which movement of the actuator output beyond the predetermined distance is permitted, a position feedback sensor configured to provide a position feedback signal representative of a position of the actuator output, a processing circuit configured to control the actuator lock to the locked configuration, initiate actuation of the actuator output away from the predetermined first position, receive the position feedback signal, determine, based on the received position feedback signal, a third position of the actuator output, determine a nominal condition of the actuator lock based on determining that the third position is within a predetermined threshold distance from the predetermined first position, and provide a signal indicative of the nominal condition.

Various examples can include some, all, or none of the following features. The processing circuit can be further configured to store a value representative of the nominal condition. The processing circuit can be further configured to determine a malfunction condition of the actuator lock based on determining that the second position is outside of the predetermined threshold distance from the predetermined first position of the actuator output, and provide, by the controller, a signal indicative of a malfunction condition of the actuator lock. The processing circuit can be further configured to store a value representative of the malfunction condition. The actuator output can be moveable from the predetermined first position through an operational distance to predetermined third position, and the predetermined threshold distance is less than the operational distance. The position sensor can be configured to detect movement of the actuator output away from the predetermined first position. The actuator can be a thrust reverser actuator of a thrust reverser actuator system, and the actuator lock is a thrust reverser actuator system lock.

In another general example, a non-transitory computer storage medium is encoded with a computer program, the computer program comprising instructions that when executed by data processing apparatus cause a data processing apparatus to perform operations including determining that an actuator output of a thrust reverser actuator is at a predetermined first position, locking a thrust reverser actuator lock configured to prevent movement of the actuator output away from the predetermined first position, initiating actuation of the actuator output away from the predetermined first position, determining, based on a position feedback signal, a second position of the actuator output, determining a nominal condition of the thrust reverser actuator lock based on determining that the second position is within a predetermined threshold distance from the predetermined first position of the actuator output, and providing, based on the determined nominal condition, a signal indicative of the nominal condition.

Various examples can include some, all, or none of the following features. The operations can include determining a malfunction condition of the thrust reverser actuator lock based on determining that the second position is outside of the predetermined threshold distance from the predetermined first position of the actuator output, and providing a signal indicative of a malfunction condition of the actuator lock. The actuator output can be moveable from the predetermined first position through an operational distance to a predetermined third position, and the predetermined threshold distance is less than the operational distance. The data processing apparatus can be a thrust reverser actuator system controller.

The systems and techniques described here may provide one or more of the following advantages. First, a system can provide automated testing of thrust reverser actuation system locks. Second, the system can be configured to perform lock testing based on time intervals and/or aircraft state. Third, the system can perform lock testing without the need for multiple human operators. Fourth, the system can perform lock testing without requiring manual recertification that the aircraft has been returned to safe flight status. Fifth, the system can perform lock testing without requiring full actuator deployment. Sixth, the system can reduce the amount of operational downtime required to perform lock testing.

The details of one or more implementations are set forth in the accompanying drawings and the description below. Other features and advantages will be apparent from the description and drawings, and from the claims.

DETAILED DESCRIPTION

This document describes systems and techniques for testing aircraft thrust reverser actuation system (TRAS) deployment locks. In general, TRAS locks include a mechanical latch or catch that is configured to interfere with a portion of a TRAS actuator output. During normal (e.g., intentional, proper) deployment, the lock is unlocked so as to not interfere with movement of the actuator output. Accidental deployment is prevented because movement of the actuator output is mechanically prevented by the lock.

Actuation of the lock mechanism can be monitored through the use of a sensor. However, there are malfunctions that can occur that prevent accurate sensing of lock position and the operational status of the lock. For example, the sensor may be configured to sense movement of a portion of the lock away from a lock finger or other portion of the lock that provides the mechanical interference that prevents actuator movement. If the lock finger is broken, then it is possible that the lock could still appear to be locked (e.g., from the perspective of the sensor), while no longer having the mechanical ability to prevent inadvertent deployment of the actuator output.

Tests to confirm the mechanical capabilities of the lock can be performed in which intentional deployment of actuator output while in the locked state is attempted. If little or no movement of the actuator output away from the stowed state is detected by a sensor, then it can be deduced that the lock has performed its function. If significant movement of the actuator output is detected in the locked configuration, then it can be deduced that a malfunction has occurred (e.g., the lock may have a mechanical failure).

Figure 1:
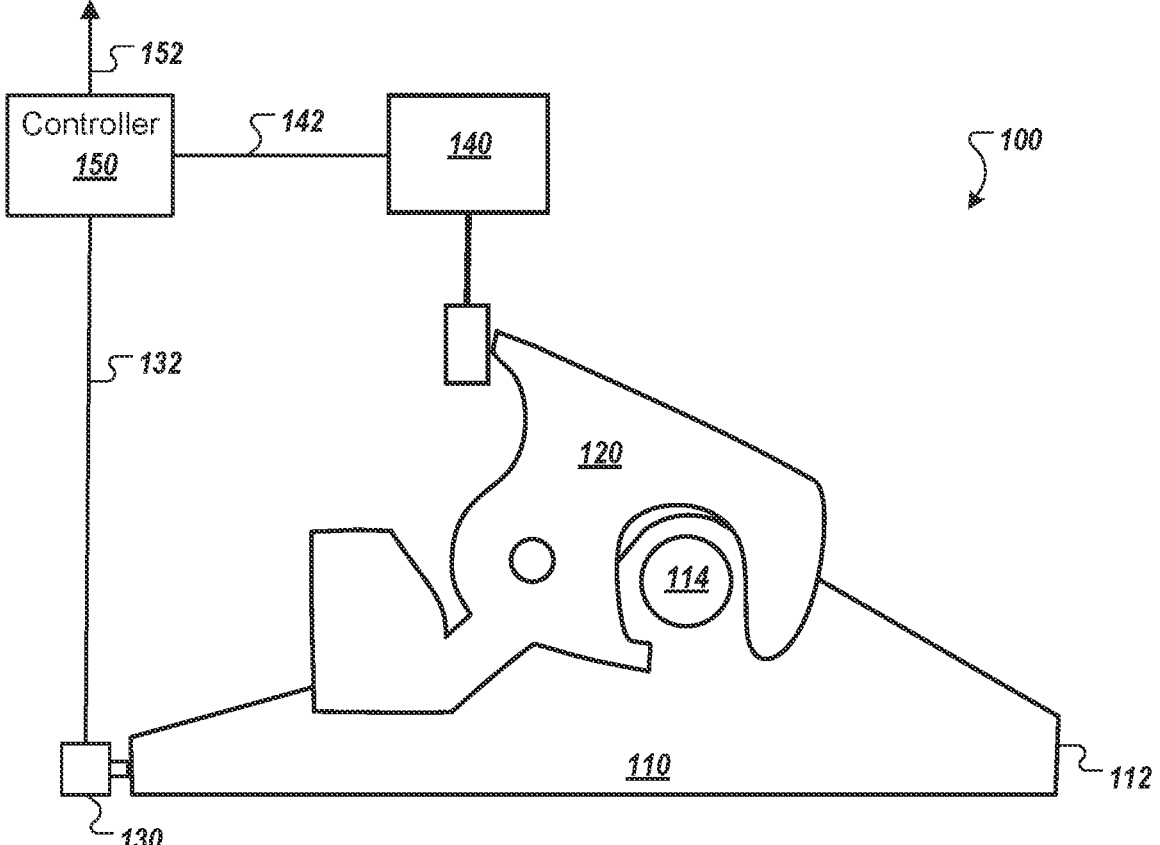
FIG. 1 is a schematic diagram that shows an example of a lock system for a thrust reverser actuation system.
Figure 2:
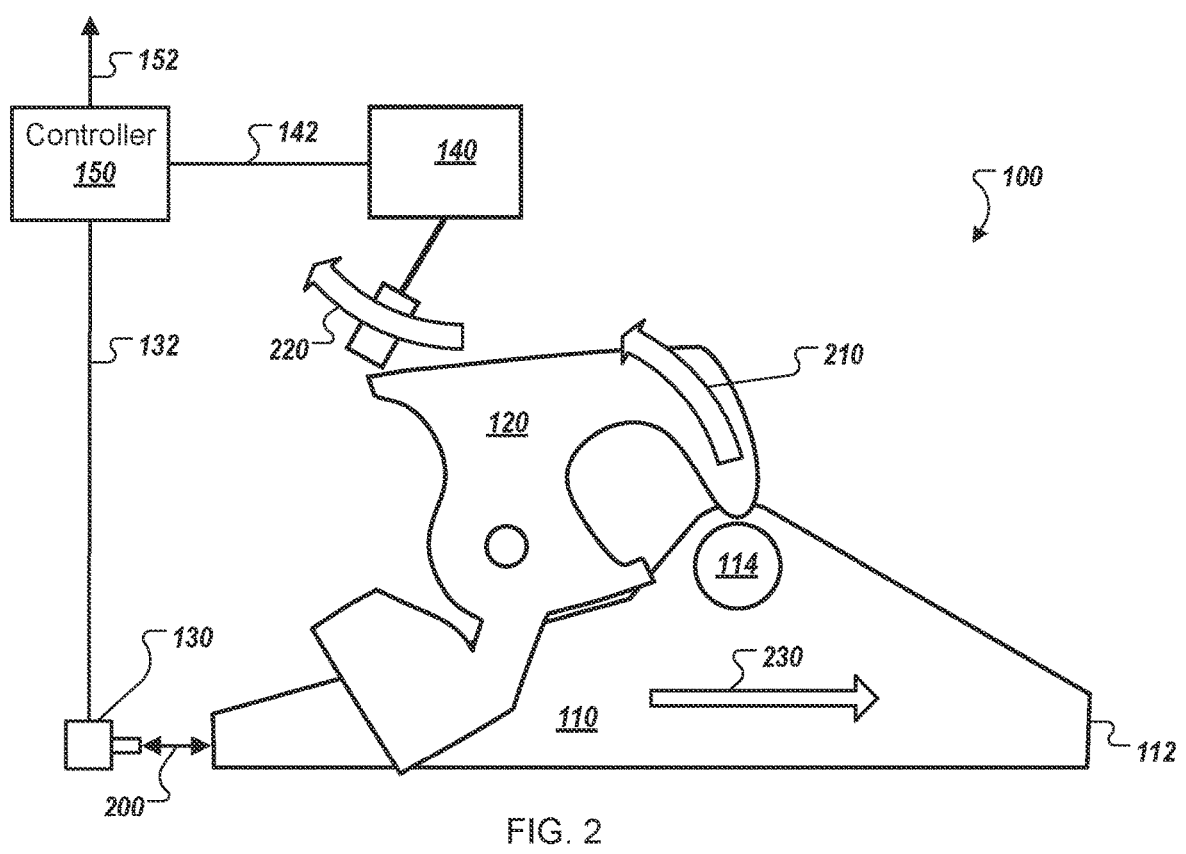
FIG. 2 shows the example lock system of FIG. 1 in operation during actuator deployment.
Figure 3:
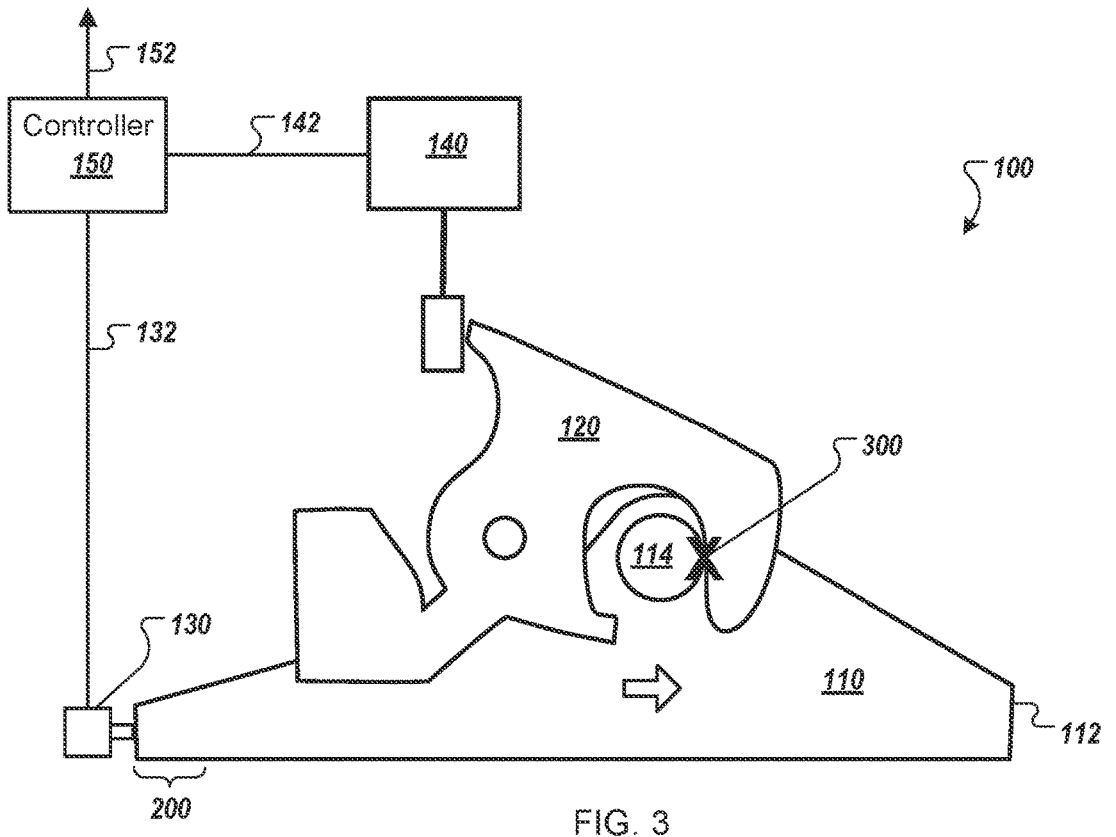
FIG. 3 shows the example lock system of FIG. 1 functioning to prevent actuator deployment.

FIG. 1 is a schematic diagram that shows an example of a thrust reverser actuator lock system 100 for a thrust reverser actuation system. FIG. 2 shows the example lock system 100 in operation during actuator deployment. FIG. 3 shows the example lock system of FIG. 1 functioning to prevent actuator deployment.

The lock system 100 includes a controllable actuator 110 configured to actuate an actuator output 112. The actuator 110 is configured to move the actuator output 112 from a predetermined stowed position or configuration, through a predetermined intermediate position or configuration, different from the stowed position, toward a deployed position or configuration. In the illustrated example of FIG. 1, the actuator output 112 is shown in the predetermined stowed position.

The lock system 100 also includes an actuator lock 120 that is controllable between a locked configuration, as shown in FIGS. 1 and 3, configured to prevent movement of the controllable actuator output 112 beyond a predetermined threshold distance 200 away from the predetermined stowed position of FIG. 1 toward the deployed position, as shown in the example configuration of FIG. 3, and an unlocked configuration in which movement of the actuator output beyond the predetermined distance is permitted, as shown in the example configuration of FIG. 2.

A position feedback sensor 130 (e.g., a position sensor) is configured to provide a position feedback signal 132 representative of a position of the actuator output 112. For example, the position feedback sensor 130 can be a proximity switch, a Hall Effect sensor, an optical detector, or any other appropriate form of contact or non-contact based form of proximity or distance sensor that can be used to determine a relative or absolute position of the actuator output 112. A position feedback sensor 140 (e.g., a position sensor) is configured to provide a position feedback signal 142 representative of a position or configuration of the actuator lock 120 (e.g., to sense whether the actuator lock 120 is locked or unlocked). The lock system 100 includes a controller 150 or other data processing apparatus. The controller 150 includes a processing circuit configured to receive the position feedback signal 132 and control the actuator lock 120.

In the example of FIG. 2, the controller 150 has commanded the actuator lock 120 to an unlocked configuration, as indicated by arrow 210. The controller 150 has also initiated actuation of the actuator output 112 away from the predetermined stowed position of FIG. 1. In the unlocked configuration, the actuator lock 120 triggers the position feedback sensor 140 (as represented by arrow 220) to send the position feedback signal 142 to the controller 150 to indicate that an unlocked state of the actuator lock 120 has been sensed. With the actuator lock 120 in the unlocked configuration, a retaining pin 114 of the actuator output 112 is allowed to escape the actuator lock 120, and the actuator output 112 is able to move (e.g., rightward in the illustrated example), as indicated by arrow 230.

In the illustrated example, the controller 150 receives the position feedback signal 142 and can correctly determine the unlocked configuration of the actuator lock 120. The controller 150 also receives the position feedback signal 132 and can determine that the actuator output 112 has moved away from the stowed configuration. The controller 150 is also configured to provide a signal 152 indicative of the nominal condition (e.g., to the flight or maintenance crew, to a maintenance monitoring system). The controller 150 is configured to store a value representative of the nominal condition.

FIG. 3 shows an example of the lock system 100 with the actuator lock 120 operating nominally to prevent deployment of the actuator 110. In the illustrated example, the controller 150 has commanded the actuator lock 120 to the locked configuration of FIGS. 1 and 3. Actuation of the actuator output 112 is initiated in an attempt to urge movement of the actuator output 112 away from the predetermined stowed position of FIG. 1. In the illustrated example, movement of the actuator output 112 is stopped by the pin 114 and the actuator lock 120, with mechanical interference occurring at a contact point 300, thus preventing further extension of the actuator 110.

The controller 150 is configured to determine that the actuator lock 120 is in the locked configuration based on the position feedback signal 142. The controller 150 is also configured to determine, based on the received position feedback signal 132, a position of the actuator output 112. If the controller 150 determines that the actuator lock 120 is locked and determines that the actuator output 112 has remained sufficiently close to the stowed position (e.g., within the predetermined threshold distance 200) based on the position feedback signal 132, then the controller 150 determines a nominal (e.g., functional, normal) operational condition of the actuator lock 120. The controller 150 is configured to provide the signal 152 indicative of the nominal condition (e.g., to the flight or maintenance crew, to a maintenance monitoring system). The controller 150 is configured to store a value representative of the nominal condition.

Figure 4:
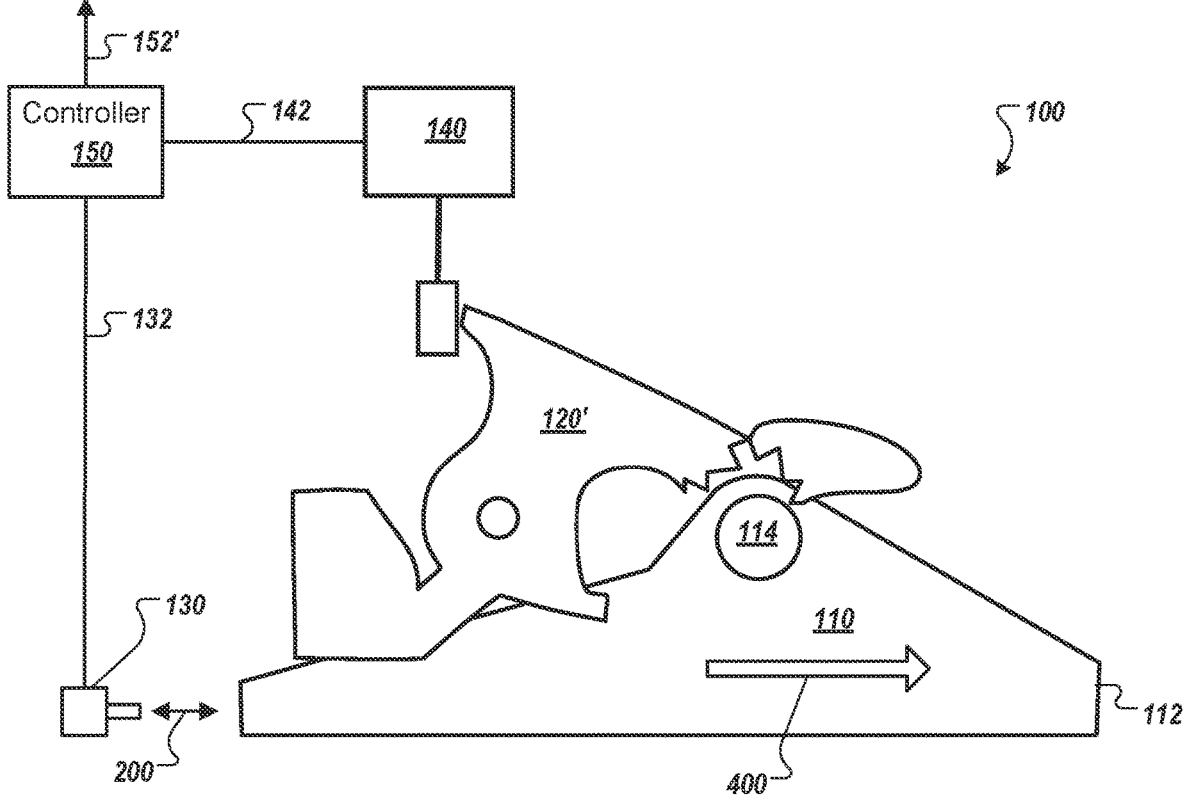
FIG. 4 shows the example lock system of FIG. 1 in an example malfunction configuration.

FIG. 4 shows the example lock system 100 in an example malfunction configuration. In the illustrated example, the actuator lock 120, identified as 120', is broken in a way that can allow the pin 114 to escape the actuator lock 120 when the lock actuator is otherwise in the locked configuration. In another example, the actuator lock 120 can be intact, but the pin 114 may be broken (e.g., sheared off) to permit unwanted movement of the actuator output 112 out of the actuator lock 120 and away from the stowed configuration, as represented by arrow 400, beyond the predetermined threshold distance 200.

In some implementations, the predetermined threshold distance 200 can be less than the distance of full deployment. For example, the position sensor 30 can be configured such that the predetermined threshold distance 200 is slightly further away from the stowed configuration that the actuator output 112 can travel when the actuator lock 120 is locked and functioning nominally. In such an example, a relatively small amount of movement of the actuator output 112 can be sufficient to trigger the position feedback signal 132, and the testing process can be performed in a relatively shorter amount of time (e.g., because the test does not require the time needed for the actuator 110 to fully travel to the deployed state and return to stowage).

In previous solutions, determination of similar malfunction conditions was a highly manual process, in which unlocking of an actuator lock would be prevented (e.g., by opening a circuit breaker on a lock actuation circuit), triggering deployment of an actuator output, and then manually observing lack of actuator movement as an indicator of nominal lock operation, or manually observing actuator movement as in indicator of a malfunction of the lock. In addition to any repair that may be needed to the lock actuator, the manual alterations to the aircraft configuration would typically have to be manually returned to operational status and then manually inspected, confirmed, and approved before the aircraft was returned to flight service.

In the illustrated examples, lock test operations can be performed in a pre-approved, repeatable, and automated configuration. In the example of FIG. 3, the breakage of the actuator lock 120' can be detected based on the position feedback signal 132 and the position feedback signal 142. The controller 150 can determine movement of the actuator output 112 beyond the predetermined threshold distance 200 based on the position feedback signal 132, despite the position feedback signal 142 indicating that the actuator lock 120' is in what is intended to be the locked configuration. Based on such discrepancy, the controller 150 is configured to provide a signal 152' indicative of a malfunction condition (e.g., to the flight or maintenance crew, to a maintenance monitoring system). The controller 150 is configured to store a value representative of the malfunction condition.

Figure 5:
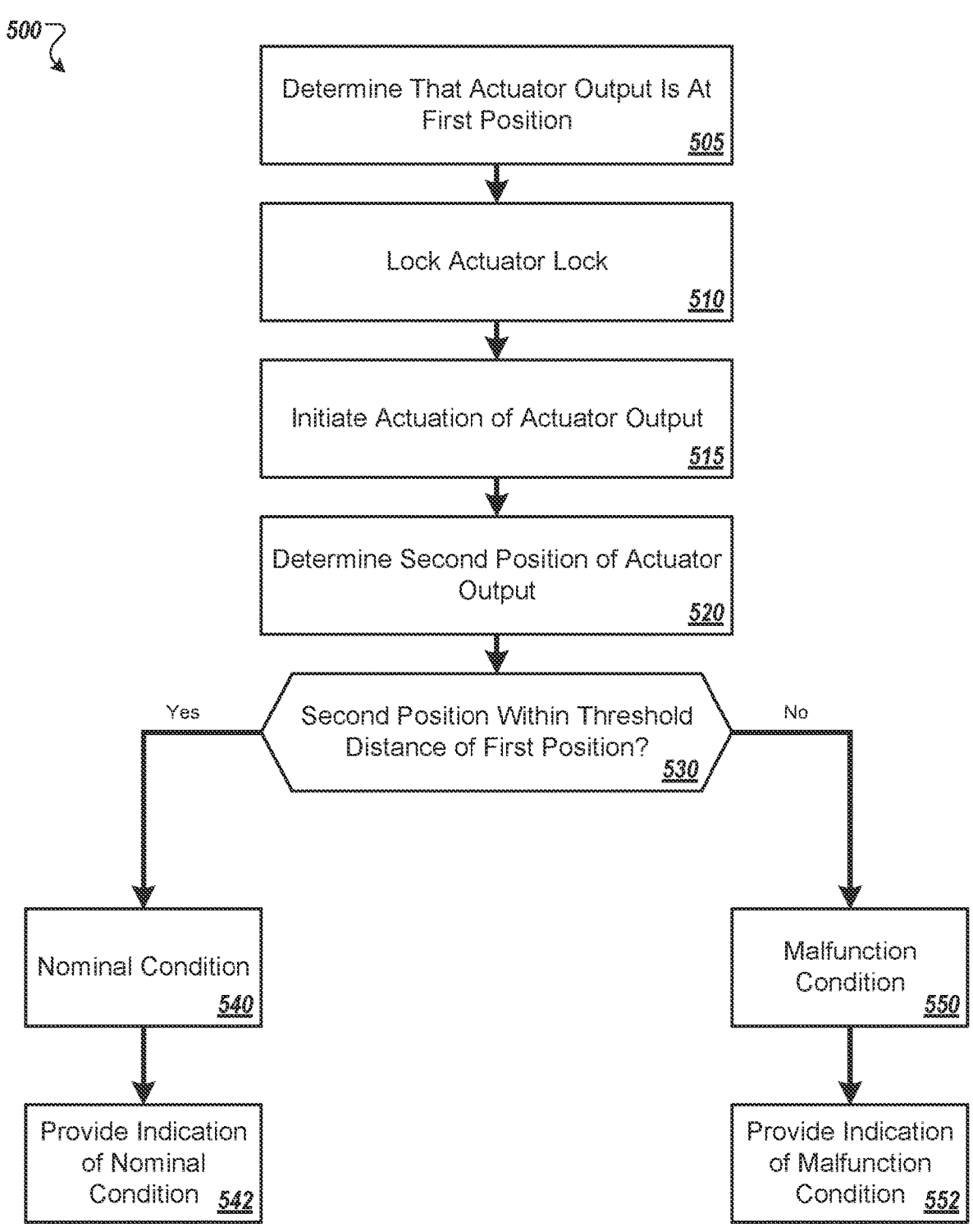
FIG. 5 is a flow chart that shows an example of a process for testing a lock system for a thrust reverser actuation system.

FIG. 5 is a flow chart that shows an example of a process 500 for testing a lock system for a thrust reverser actuation system. In some implementations, the process 500 can be performed by all or part of the example lock system 100 (e.g., the example controller 150).

At 505, a controller determines that an actuator output of a controllable actuator is at a predetermined first position. For example, the controller 150 can receive the position feedback signal 132 and determine that the actuator output 112 is in the example stowed configuration of FIG. 1.

At 510, the controller locks an actuator lock configured to prevent movement of the actuator output of an actuator away from the predetermined first position. For example, the actuator lock 120 is configured to selectively allow and prevent movement of the actuator output 112 away from the example stowed configuration of FIG. 1. The controller 150 can command the actuator lock 120 to the example locked configuration of FIG. 1.

In some implementations, the process 500 can include receiving a test initiation signal, where the controller can be configured to perform the locking based on the received test initiation signal. For example, the controller 150 can receive an input from an operator (e.g., pilot, aircraft mechanic) or an automated system (e.g., a timer, a state machine) indicative of a request to perform a test of the example, lock system 100, and respond by initiating step 505 and/or 510.

In some implementations, the process 500 can include determining, by the controller, one or more of a predetermined aircraft operational state, a predetermined time interval, or a predetermined aircraft operational status, where the controller is configured to perform the locking based on the predetermined aircraft operational status, the predetermined time interval, or the predetermined aircraft operational status. For example, the controller 150 can be configured to perform the process 500 in response to a user input, in response to detecting that the aircraft is safely on the ground and stationary, in response to determining that a periodic service interval is due (e.g., once per flight, once per day, once every 100 flight hours), as part of a pre-flight or post-flight check procedure, and/or any appropriate combination of these and any other appropriate determinable state of time and/or the aircraft.

At 515, the controller initiates actuation of the actuator output away from the predetermined first position. For example, with the actuator lock 120 intentionally left in the example locked configuration, the controller 150 can command deployment of the actuator output 112 away from the example stowed configuration (e.g., toward deployment).

In some implementations, the actuator output can be moveable from the predetermined first position through an operational distance to a predetermined third position, and the predetermined threshold distance is less than the operational distance. For example, the actuator output 112 can be actuated from the stowed configuration (e.g., FIG. 1) and toward a deployed configuration, passing through an intermediate configuration at the predetermined threshold distance 200.

At 520, the controller determines a second position of the actuator output based on a position feedback sensor. For example, the controller 150 can receive the position feedback signal 132 to determine whether or not the actuator output has moved beyond the predetermined threshold distance 200 in response to the commended movement.

In some implementations, the position sensor can be configured to detect movement of the actuator output away from the predetermined first position. For example, the position feedback sensor 130 can be configured to detect movement of the actuator output 112 away from the example stowed configuration (e.g., FIG. 1) and beyond the example predetermined threshold distance 200 (e.g., FIG. 4).

At 530 a determination is made. If the second position is within a predetermined threshold distance from the predetermined first position of the actuator output, then at 540 a nominal condition is determined. For example, the controller 150 can receive the position feedback signal 132 and determine that the actuator output has not moved beyond the predetermined threshold distance 200 in response to the commanded movement, and determine that the substantial lack of output movement is a nominal (e.g., expected, normal function) behavior of a functioning (e.g., not broken) lock system.

At 542, the controller provides a signal indicative of the nominal condition, based on the determined nominal condition. For example, the controller 150 can send the signal 152.

If, at 530, the second position is outside of the predetermined threshold distance from the predetermined first position of the actuator output, then a malfunction condition is determined. For example, the controller 150 can receive the position feedback signal 132 and determine that the actuator output has moved beyond the predetermined threshold distance 200 in response to the commanded movement, and determine that the excessive output movement is a malfunction condition or behavior of the lock system 100.

At 532, the controller provides a signal indicative of a malfunction condition of the actuator lock. For example, the controller 150 can send the signal 152'.

In some implementations, the process 500 can include storing, by the controller, a value representative of the malfunction condition. For example, the controller 150 can record data to a log or database to indicate the detection of the nominal condition and/or the malfunction condition. In another example, another computer system can receive the signal 152 and/or 152', and store a value in volatile memory, non-volatile memory, or record the value(s) on an electronic storage medium to represent the identified condition(s).

Figure 6:
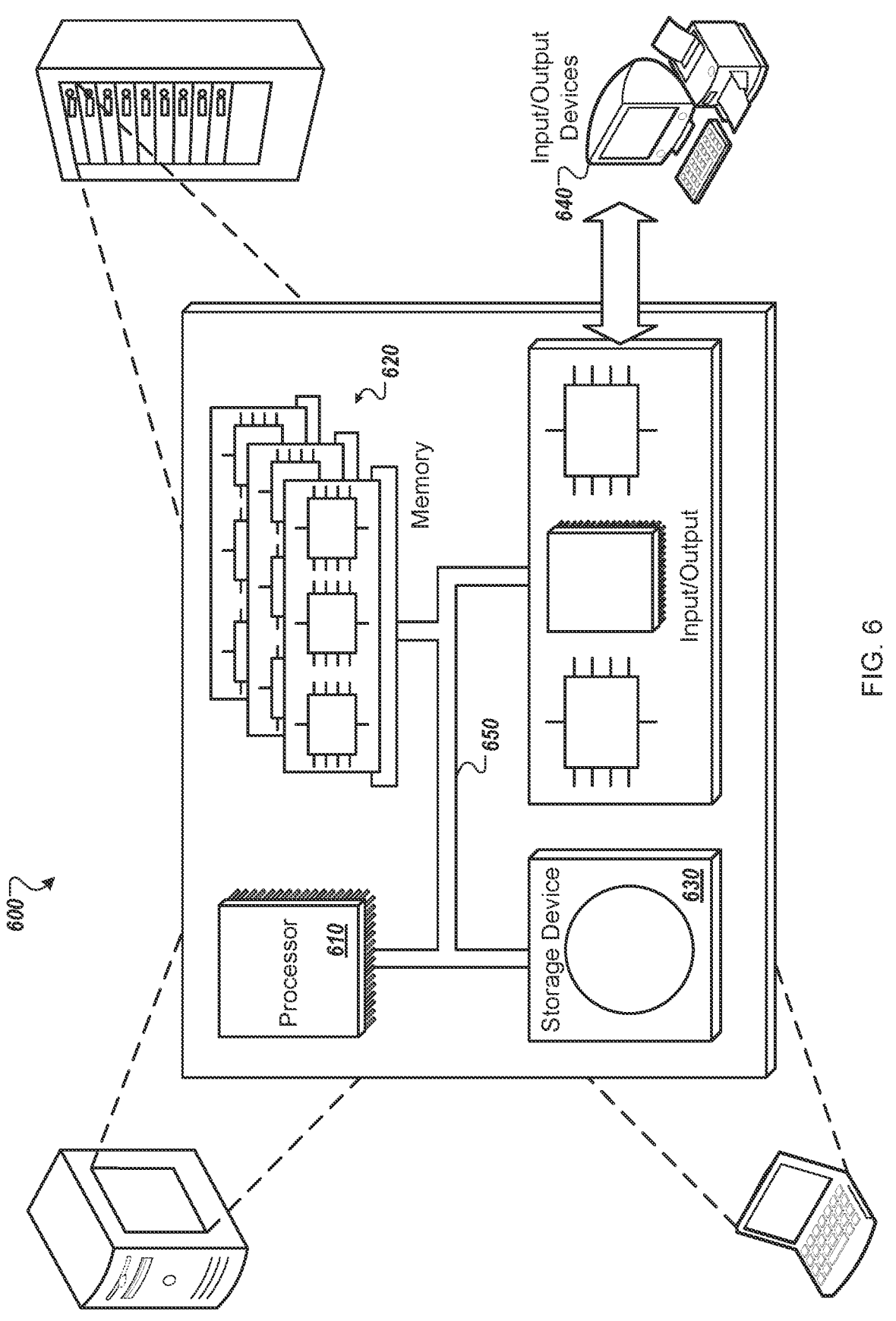
FIG. 6 is a schematic diagram of an example of a generic computer system.

FIG. 6 is a schematic diagram of an example of a generic computer system 600. The system 600 can be used for the operations described in association with the example process 500 of FIG. 5 according to an example implementation. For example, the system 600 may be included in the example controller 150 of FIGS. 1-4.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit or a non-transitory computer storage medium.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for testing operation of a thrust reverser actuator lock for an aircraft thrust reverser actuation system, comprising:

determining, by a controller, that an actuator output of a controllable actuator is at a predetermined first position;

locking, by the controller, an actuator lock configured to prevent movement of the actuator output of an actuator away from the predetermined first position when the actuator lock is in a locked configuration;

initiating, by the controller, with the actuator lock in the locked configuration, actuation of the actuator output away from the predetermined first position;

determining, by the controller based on a position feedback sensor, a second position of the actuator output;

determining, by the controller, a nominal condition of the actuator lock based on determining that (i) the second position is within a predetermined threshold distance from the predetermined first position of the actuator output, and (ii) the actuator lock is in the locked configuration; and providing, by the controller and based on the determined nominal condition, a signal indicative of the nominal condition.

2. The method of claim 1, further comprising storing, by the controller, a value representative of the nominal condition.

3. The method of claim 1, further comprising:

determining, by the controller, a malfunction condition of the actuator lock based on determining that (i) the second position is outside of the predetermined threshold distance from the predetermined first position of the actuator output and (ii) the actuator lock is in a locked configuration; and providing, by the controller, a signal indicative of a malfunction condition of the actuator lock.

4. The method of claim 3, further comprising storing, by the controller, a value representative of the malfunction condition.

5. The method of claim 1, wherein the actuator output is moveable from the predetermined first position through an operational distance to a predetermined third position, and the predetermined threshold distance is less than the operational distance.

6. The method of claim 1, wherein the position sensor is configured to detect movement of the actuator output away from the predetermined first position.

7. The method of claim 1, further comprising receiving a test initiation signal, wherein the controller is configured to perform the locking based on the received test initiation signal.

8. The method of claim 1, further comprising determining, by the controller, one or more of a predetermined aircraft operational state, a predetermined time interval, or a predetermined aircraft operational status, wherein the controller is configured to perform the locking based on the predetermined aircraft operational status, the predetermined time interval, or the predetermined aircraft operational status.

9. A test system for testing operation of a thrust reverser actuator lock for an aircraft thrust reverser actuation system, the test system comprising:

a controllable actuator configured to actuate an actuator output between a predetermined first position and a second position different from the predetermined first position;

an actuator lock controllable to a locked configuration configured to prevent movement of the controllable actuator output beyond a predetermined distance away from the predetermined first position toward the second position, and an unlocked configuration in which movement of the actuator output beyond the predetermined distance is permitted;

a position feedback sensor configured to provide a position feedback signal representative of a position of the actuator output;

a processing circuit configured to:

control the actuator lock to the locked configuration;

initiate, with the actuator lock in the locked configuration, actuation of the actuator output away from the predetermined first position;

receive the position feedback signal;

determine, based on the received position feedback signal, a third position of the actuator output;

determine a nominal condition of the actuator lock based on determining that (i) the third position is within a predetermined threshold distance from the predetermined first position and that (ii) the actuator lock is in the locked configuration; and provide a signal indicative of the nominal condition.

10. The test system of claim 9, wherein the processing circuit is further configured to store a value representative of the nominal condition.

11. The test system of claim 9, wherein the processing circuit is further configured to:

determine a malfunction condition of the actuator lock based on determining that (i) the second position is outside of the predetermined threshold distance from the predetermined first position of the actuator output, and (ii) the actuator lock is in the locked configuration; and provide, by the controller, a signal indicative of a malfunction condition of the actuator lock.

12. The test system of claim 11, wherein the processing circuit is further configured to store a value representative of the malfunction condition.

13. The test system of claim 9, wherein the actuator output is moveable from the predetermined first position through an operational distance to predetermined third position, and the predetermined threshold distance is less than the operational distance.

14. The test system of claim 9, wherein the position sensor is configured to detect movement of the actuator output away from the predetermined first position.

15. The test system of claim 9, wherein the actuator is a thrust reverser actuator of a thrust reverser actuator system, and the actuator lock is a thrust reverser actuator system lock.

16. A non-transitory computer storage medium encoded with a computer program, the computer program comprising instructions that when executed by data processing apparatus cause a data processing apparatus to perform operations comprising:

determining that an actuator output of a thrust reverser actuator is at a predetermined first position;

locking a thrust reverser actuator lock configured to prevent movement of the actuator output away from the predetermined first position when the actuator lock is in a locked configuration;

initiating, with the actuator lock in the locked configuration, actuation of the actuator output away from the predetermined first position;

determining, based on a position feedback signal, a second position of the actuator output;

determining a nominal condition of the thrust reverser actuator lock based on determining that (i) the second position is within a predetermined threshold distance from the predetermined first position of the actuator output, and (ii) the actuator lock is in the locked configuration; and providing, based on the determined nominal condition, a signal indicative of the nominal condition.

17. The non-transitory computer storage medium of claim 16, the operations further comprising:

determining a malfunction condition of the thrust reverser actuator lock based on determining that (i) the second position is outside of the predetermined threshold distance from the predetermined first position of the actuator output, and (ii) the actuator lock is in the locked configuration; and providing a signal indicative of a malfunction condition of the actuator lock.

18. The non-transitory computer storage medium of claim 16, wherein the actuator output is moveable from the predetermined first position through an operational distance to a predetermined third position, and the predetermined threshold distance is less than the operational distance.

19. The non-transitory computer storage medium of claim 16, wherein the data processing apparatus is a thrust reverser actuator system controller.

* * * * *